(12) United States Patent
Oonishi

(10) Patent No.: US 7,211,998 B2
(45) Date of Patent: May 1, 2007

(54) ACCELERATION SENSING APPARATUS

(75) Inventor: Jun Oonishi, Mizuho (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/474,867

(22) Filed: Jun. 26, 2006

(65) Prior Publication Data

US 2007/0001678 A1    Jan. 4, 2007

(30) Foreign Application Priority Data

Jun. 29, 2005 (JP) .............................. 2005-189666
Sep. 8, 2005 (JP) .............................. 2005-261151

(51) Int. Cl.
*G01P 3/42* (2006.01)

(52) U.S. Cl. ...................... 324/162; 324/422; 324/178; 73/514.01

(58) Field of Classification Search ................ 324/422, 324/162, 178; 73/514.01
See application file for complete search history.

(56) References Cited

U.S. PATENT DOCUMENTS 5,801,309 A * 9/1998 Carr et al. ............... 73/514.29
6,216,537 B1 * 4/2001 Henschel et al. ............. 73/493
6,748,807 B2 6/2004 Yoshiuchi et al. ............ 73/493
6,810,738 B2 * 11/2004 Sakaguchi .................... 73/510
6,953,993 B2 * 10/2005 Yamaguchi ................. 257/704
7,007,550 B2 * 3/2006 Sakai et al. .............. 73/514.29
2004/0201464 A1 10/2004 Oonishi

FOREIGN PATENT DOCUMENTS

JP 2002-022761 1/2002
WO WO 03/025587 3/2002

* cited by examiner

*Primary Examiner*—Andrew Hirshfeld
*Assistant Examiner*—Thomas Valone
(74) *Attorney, Agent, or Firm*—Harness, Dickey & Pierce, PLC

(57) ABSTRACT

A collision sensing apparatus includes an acceleration sensor, first and second connector terminals, reference connector terminals and leads. The acceleration sensor is shaped into a square form. First and second contacts are provided in two diagonally opposed corner portions of the sensor. Reference contacts are arranged in the other two diagonally opposed corner portions of the sensor. The first and second connector terminals are opposed to the first and second contacts, respectively. The reference connector terminals are opposed to the reference contacts, respectively. The leads connect the first and second connector terminals and the reference connector terminals to the first and second contacts and the reference contacts.

14 Claims, 14 Drawing Sheets

ACCELERATION SENSING APPARATUS

CROSS REFERENCE TO RELATED APPLICATION

This application is based on and incorporates herein by reference Japanese Patent Application No. 2005-189666 filed on Jun. 29, 2005 and Japanese Patent Application No. 2005-261151 filed on Sep. 8, 2005.

BACKGROUND OF THE INVENTION

1. Field of the Invention

The present invention relates to a sensing apparatus, which senses a physical displacement in a predetermined direction.

2. Description of Related Art

An air bag system is known as an occupant protective apparatus, which protects an occupant of a vehicle. The air bag system may include a plurality of sensing apparatuses, which sense an impact applied to the vehicle. When the vehicle collides, an air bag of the air bag system is deployed based on a sensed result of the sensing apparatuses to protect the occupant of the vehicle. For example, Japanese Unexamined Patent publication No. 2004-294419 (corresponding to US 2004/0201464 A1, the contents of which are incorporated herein by reference) discloses one such sensing apparatus, called a collision sensing apparatus, which is a sensing apparatus that can sense the impact applied to the vehicle.

The collision sensing apparatus includes a G sensor, a housing, connector terminals and leads. The G sensor is a sensor that outputs a signal, which corresponds to a degree of an applied acceleration. The G sensor includes a sensing device, a communication device and a power supply circuit, which are packaged into a single package. The housing is a case, which fixes the connector terminals and receives the G sensor. The connector terminals, which are made of metal and externally and electrically connect the G sensor, are molded integrally with the housing. Furthermore, a sensor receiving portion, which receives the G sensor, is formed in the housing. End portions of the connector terminals are exposed in the sensor receiving portion, and the G sensor is connected to the end portions of the connector terminals through the leads made of metal.

The above G sensor is designed to sense only the acceleration in a predetermined direction. Thus, the collision sensing apparatus can sense only the impact in the single direction. In general, in the air bag system, the air bag is deployed based on the impacts applied to the vehicle from the various directions. Therefore, the multiple impact sensing apparatuses need to be provided to correspond with the directions of the impacts, which need to be sensed. However, in some cases, due to a limited amount of available space on the vehicle, one or more of the collision sensing apparatuses cannot be installed in consistency with the corresponding sensing direction(s). In such a case, the orientation of the G sensor in the housing of the corresponding collision sensing apparatus needs be changed. At this time, the shapes of the connector terminals or the positions of contacts of the G sensor should be changed in response to the change in the orientation of the G sensor. These changes require a change in the molding die, thereby resulting in the increased costs. This will lead to the increased manufacturing costs of the collision sensing apparatuses.

SUMMARY OF THE INVENTION

The present invention addresses the above disadvantages. Thus, it is an objective of the present invention to provide a sensing apparatus, which enables a change in a sensing direction of a physical displacement with no or a little modification of components of the sensing apparatus at relatively low costs.

To achieve the objective of the present invention, there is provided a sensing apparatus, which includes a sensor, a first connector terminal, a second connector terminal, at least one reference connector terminal and a plurality of leads. The sensor senses a physical acceleration in a predetermined direction and is shaped into a quadrangular form. The sensor includes a first input/output contact, a second input/output contact and at least one reference contact. The first input/output contact and the second input/output contact are arranged in two diagonally opposed corner portions, respectively, of the sensor. The at least one reference contact is arranged in at least one of the other two diagonally opposed corner portions of the sensor. The first connector terminal conducts an input/output signal to the first input/output contact and is arranged such that a sensor side end of the first connector terminal is opposed to one of two adjacent sides of the sensor, which come together at the corner portion of the sensor where the first input/output contact is arranged. The second connector terminal conducts an input/output signal to the second input/output contact and is arranged such that a sensor side end of the second connector terminal is opposed to an opposite side of the sensor that is opposite from the side of the sensor, to which the sensor side end of the first connector terminal is opposed. The at least one reference connector terminal conducts a reference signal to the at least one reference contact and is arranged such that a sensor side end of each of the at least one reference connector terminal is opposed to a corresponding one of two mutually opposed sides of the sensor, to which the first connector terminal and the second connector terminal are not opposed. The leads connect the first input/output contact, the second input/output contact and the at least one reference contact to the first connector terminal, the second connector terminal and the at least one reference connector terminal, respectively.

The quadrangular form of the sensor may be a square form having the sides of generally equal size. The at least one reference contact may include two reference contacts, which are arranged in the other two diagonally opposed corner portions, respectively, of the sensor. The at least one reference connector terminal may include two reference connector terminals, which conduct the reference signal to the reference contacts, respectively, and are arranged such that the sensor side ends of the reference connector terminals are opposed to the two mutually opposed sides, respectively, of the sensor. An extent of the first connector terminal, which is measured in a direction parallel to the side of the sensor that is adjacent to and is opposed to the first connector terminal, may be generally equal to an extent of the side of the sensor that is adjacent to and is opposed to the first connector terminal. An extent of the second connector terminal, which is measured in a direction parallel to the side of the sensor that is adjacent to and is opposed to the second connector terminal, may be generally equal to an extent of the side of the sensor that is adjacent to and is opposed to the second connector terminal. An extent of one of the reference connector terminals, which is measured in a direction parallel to the side of the sensor that is adjacent to and is opposed to the one of the reference connector terminals, may be generally equal to an extent of the side of the sensor that is adjacent to and is opposed to the one of the reference connector terminals. An extent of the other one of the reference connector terminals, which is measured in a direction parallel to the side of the sensor that is adjacent to and is opposed to the other one of the reference connector terminals, may be generally equal to an extent of the side of the sensor that is adjacent to and is opposed to the other one of the reference connector terminals.

To achieve the objective of the present invention, there is also provided a sensing apparatus, which includes a sensor, a first connector terminal, a second connector terminal, at least one reference connector terminal and a plurality of leads. The sensor senses a physical acceleration in a predetermined direction and is shaped into a quadrangular form. The sensor includes a first input/output contact, a second input/output contact and at least one reference contact. The first input/output contact and the second input/output contact are arranged in two diagonally opposed corner portions, respectively, of the sensor. The at least one reference contact is arranged in at least one of the other two diagonally opposed corner portions of the sensor. The first connector terminal conducts an input/output signal to the first input/output contact and is arranged such that a sensor side end of the first connector terminal is opposed to one of two adjacent sides of the sensor, which come together at the corner portion of the sensor where the first input/output contact is arranged. The second connector terminal conducts an input/output signal to the second input/output contact and is arranged such that a sensor side end of the second connector terminal is opposed to an opposite side of the sensor that is opposite from the side of the sensor, to which the sensor side end of the first connector terminal is opposed. The at least one reference connector terminal conducts a reference signal to the at least one reference contact and is arranged such that a sensor side end of each of the at least one reference connector terminal is opposed to a corresponding one of: the side of the sensor, to which the first connector terminal is opposed; and the side of the sensor, to which the second connector terminal is opposed. The leads connect the first input/output contact, the second input/output contact and the at least one reference contact to the first connector terminal, the second connector terminal and the at least one reference connector terminal, respectively.

The quadrangular form of the sensor may be a square form having the sides of generally equal size. The at least one reference contact may include two reference contacts, which are arranged in the other two diagonally opposed corner portions, respectively, of the sensor. The at least one reference connector terminal may include two reference connector terminals, which conduct the reference signal to the reference contacts, respectively, and are arranged such that the sensor side end of one of the reference connector terminals is opposed to the side of the sensor, to which the first connector terminal is opposed, and the sensor side end of the other one of the reference connector terminals is opposed to the side of the sensor, to which the second connector terminal is opposed. An extent of the first connector terminal, which is measured in a direction parallel to the side of the sensor that is opposed to the first connector terminal, may be generally equal to an extent of the side of the sensor that is opposed to the first connector terminal. An extent of the second connector terminal, which is measured in a direction parallel to the side of the sensor that is opposed to the second connector terminal, may be generally equal to an extent of the side of the sensor that is opposed to the second connector terminal. An extent of the one of the reference connector terminals, which is measured in a direction parallel to the side of the sensor that is opposed to the first connector terminal, may be generally equal to the extent of the side of the sensor that is opposed to the first connector terminal. An extent of the other one of the reference connector terminals, which is measured in a direction parallel to the side of the sensor that is opposed to the second connector terminal, may be generally equal to the extent of the side of the sensor that is opposed to the second connector terminal.

BRIEF DESCRIPTION OF THE DRAWINGS

The invention, together with additional objectives, features and advantages thereof, will be best understood from the following description, the appended claims and the accompanying drawings in which:

FIRST EMBODIMENT

Figure 1:
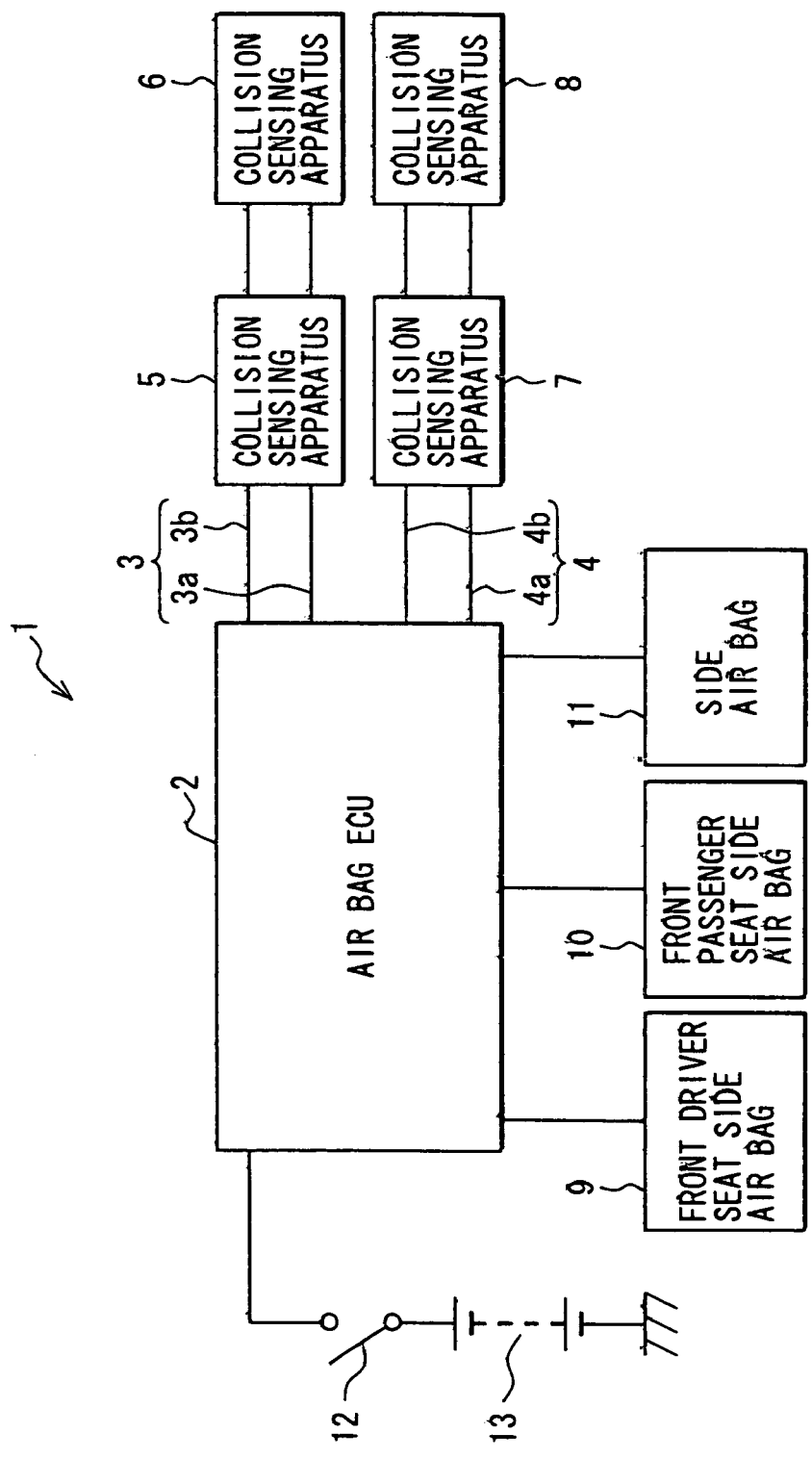
FIG. 1 is a diagram showing a structure of an air bag system according to a first embodiment of the present invention.

A sensing apparatus according to a first embodiment of the present invention is formed as a component of an air bag system and is implemented as a collision sensing apparatus, which senses a collision of a vehicle. FIG. 1 shows a structure of the air bag system.

The structure of the air bag system will be described with reference to FIG. 1. As shown in FIG. 1, the air bag system 1 includes an air bag ECU 2, communication buses 3, 4, collision sensing apparatuses 5–8 (sensing apparatuses), a front driver seat side air bag 9, a front passenger seat side air bag 10 and side air bags 11. A battery 13 is connected to the air bag ECU 2 through an ignition switch 12.

The air bag ECU 2 deploys the front driver seat side air bag 9, the front passenger seat side air bag 10 and/or the side air bag(s) 11 based on the measured acceleration, which is sensed by an internal sensor, and also the measured acceleration(s), which is sensed by the collision sensing apparatuses 5–8. The air bag ECU 2 is positioned generally in the center of the vehicle.

The communication buses 3, 4 are signal lines, which supply the power source voltage from the air bag ECU 2 to the collision sensing apparatuses 5–8 and transmit the commands and data between the air bag ECU 2 and the collision sensing apparatuses 5–8. The respective communication bus 3, 4 includes a reference line $3a$, $4a$ and a transmission line $3b$, $4b$.

Each of the collision sensing apparatuses 5–8 senses the acceleration in a corresponding predetermined direction at the corresponding part of the vehicle and transmits the sensed result as the acceleration data through the corresponding communication bus 3, 4 based on a data transmission request supplied from the air bag ECU 2. Each collision sensing apparatus 5–8 is arranged in the corresponding crash zone of the vehicle and senses the acceleration in the fore-and-aft direction or the left-to-right direction of the vehicle. The collision sensing apparatuses 5, 6 are connected in series to the air bag ECU 2 through the communication bus 3. The collision sensing apparatuses 7, 8 are connected in series to the air bag ECU 2 through the communication bus 4.

The front driver seat side air bag 9, the front passenger seat side air bag 10 and the side air bags 11 are protective devices, which are deployed based on the corresponding command from the air bag ECU 2 to protect a vehicle occupant(s). The front driver seat side air bag 9 is provided in front of the front driver seat, and the front passenger seat side air bag 10 is provided in front of the front passenger seat. The side air bags 11 are arranged on the lateral side of the front driver seat and the lateral side of the front passenger seat, respectively.

Figure 2:
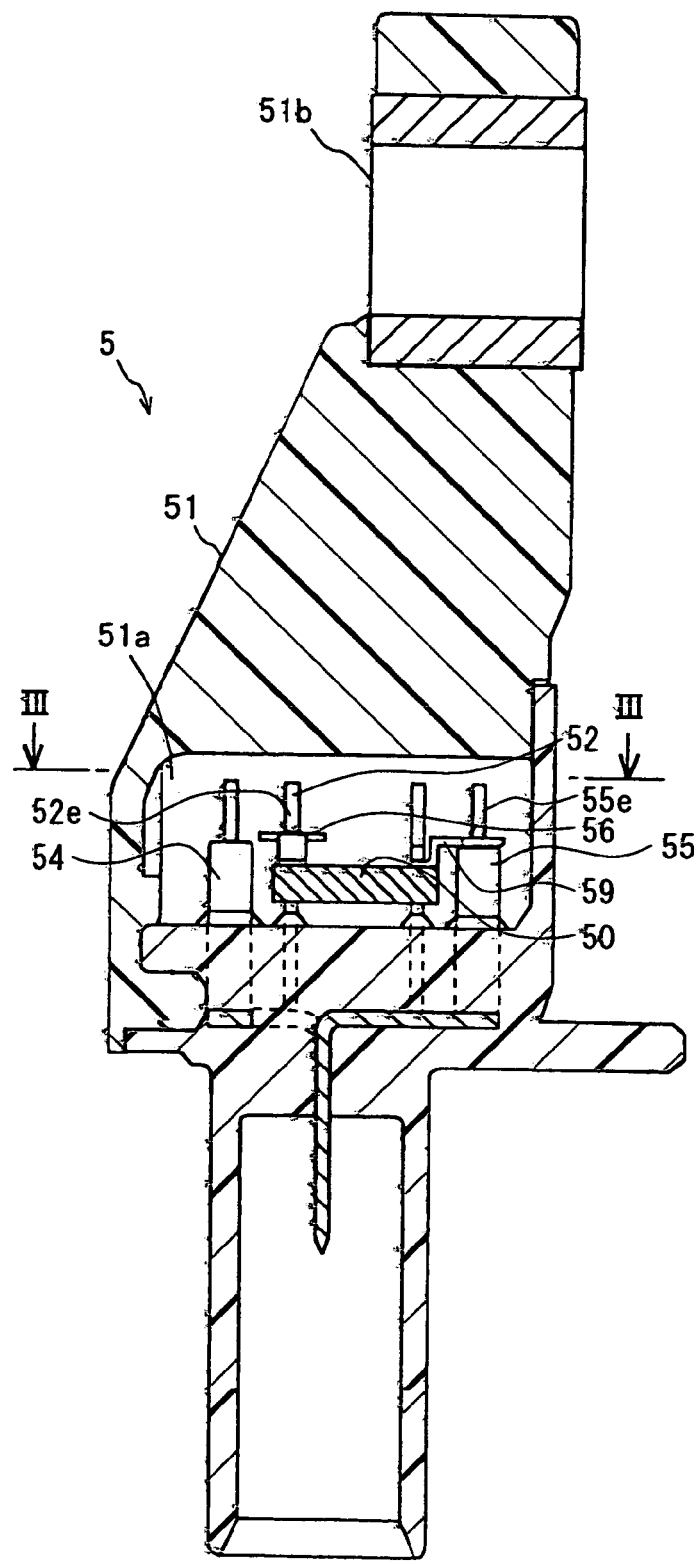
FIG. 2 is a cross sectional view of a collision sensing apparatus according to the first embodiment.
Figure 3:
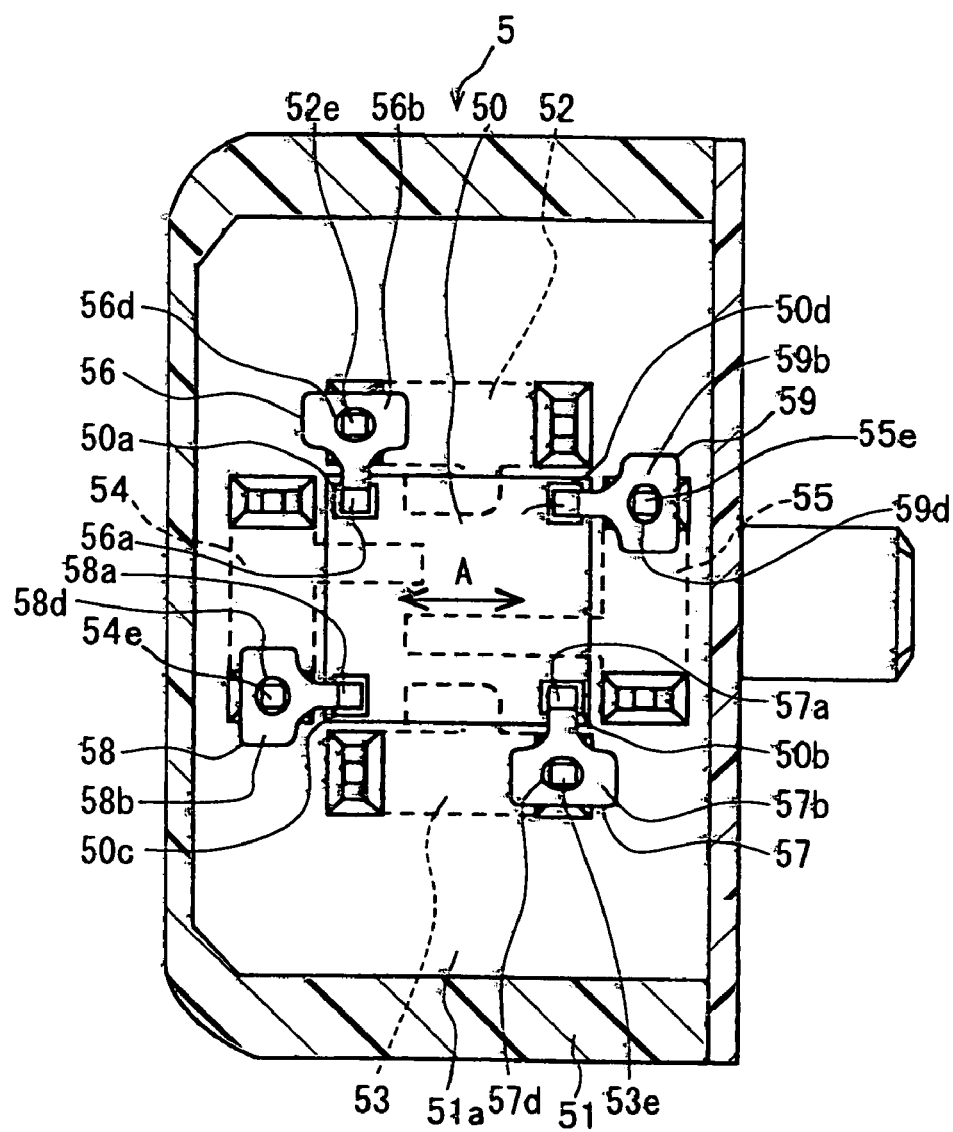
FIG. 3 is a cross sectional view taken along line III—III in FIG. 2.

Now, the structure of the collision sensing apparatuses 5–8 will be described with reference to FIGS. 2 to 5. The collision sensing apparatuses 5–8 have the same structure, so that only the collision sensing apparatus 5 will be described below. As shown in FIGS. 2 and 3, the collision sensing apparatus 5 includes an acceleration sensor 50 (sensor), a connector case 51, a first connector terminal 52 (a first connector contact), a second connector terminal 53 (a second connector contact), two reference connector terminals 54, 55 (reference connector contacts) and four leads 56–59.

The acceleration sensor 50 is the sensor that senses the acceleration in the predetermined direction and transmits the sensed acceleration data based on the data transmission request command supplied from the air bag ECU 2. As shown in FIG. 3, the acceleration sensor 50 is shaped into a square form having four sides of generally equal size. The acceleration sensor 50 includes a first contact $50a$ (a first input/output contact) and a second contact $50b$ (a second input/output contact) at two diagonally opposed corner portions, respectively, of the acceleration sensor 50. The acceleration sensor 50 further includes two reference contacts $50c$, $50d$ (reference contacts) at the other two diagonally opposed corner portions, respectively, of the acceleration sensor 50. The acceleration sensor 50 receives the data transmission request command, which is inputted to the first contact $50a$ and determines whether the acceleration sensor 50 itself is a communication subject. When it is determined that the acceleration sensor 50 itself is the communication subject, the acceleration sensor 50 transmits the sensed acceleration data from the first contact $50a$. Furthermore, the acceleration sensor 50 transmits the data transmission request command, which is inputted to the first contact $50a$, from the second terminal $50b$. Furthermore, the acceleration sensor 50 transmits the data, which is inputted to the second contact $50b$, from the first contact $50a$. The reference contacts $50c$, $50d$ are contacts, which are used to communicate a reference signal that serves as a reference of the signal transmitted through the first and second contacts $50a$, $50b$. Furthermore, the reference contacts $50c$, $50d$ are interconnected with each other in the interior of the acceleration sensor 50. Although not illustrated in the drawings, the acceleration sensor 50 includes a sensing device and a communicating device (an outputting device). The sensing device is a block that senses the acceleration in the predetermined direction (in accordance with a physical displacement of a sensing portion of the sensing device in the predetermined direction). The communicating device is a block that controls transmission and reception of data, like ones described above. The sensing device and the communicating device are packaged into a signal package.

As shown in FIGS. 2 and 3, the connector case 51 is a resin case, which fixes the first and second connector terminals 52, 53 and the reference connector terminals 54, 55 and receives the acceleration sensor 50. The first and second connector terminals 52, 53 and the reference connector terminals 54, 55 are formed integrally with the connector case 51. Furthermore, the connector case 51 includes an acceleration sensor receiving portion (an acceleration sensor receiving chamber) $51a$, which receives the acceleration sensor 50. Furthermore, a cylindrical metal bush $51b$ is integrally molded into an end portion of the connector case 51. The metal bush $51b$ receives a bolt therethrough to install the connector case 51 to the vehicle.

The first and second connector terminals 52, 53 and the reference connector terminals 54, 55 are plate-shaped conductors that connect the acceleration sensor 50, which is connected to the terminals 52–54 through the leads 56–59, to the communication bus 3 of FIG. 1. The first connector terminal 52 connects the first contact $50a$ of the acceleration sensor 50 to the transmission line $3b$ located on the air bag ECU 2 side. The second connector terminal 53 connects the second contact $50b$ of the acceleration sensor 50 to the transmission line $3b$ on the collision sensing apparatus 6 side. Furthermore, the reference connector terminals 54, 55 connect the reference contacts 50c, 50d of the acceleration sensor 50 to the reference line 3a on the air bag ECU 2 side and the reference line 3a on the collision sensing apparatus 6 side, respectively.

Figure 4A:
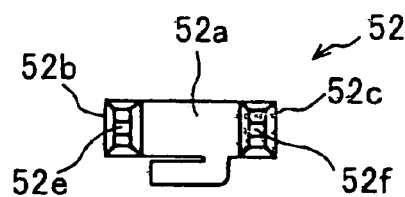
FIG. 4A is a top view of a connector terminal shown FIG. 3.
Figure 4B:
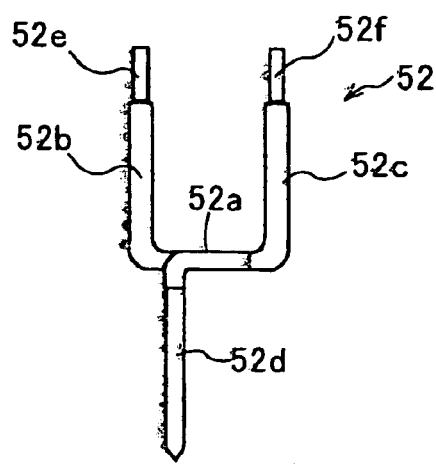
FIG. 4B is a front view of the connector terminal shown FIG. 3.
Figure 4C:
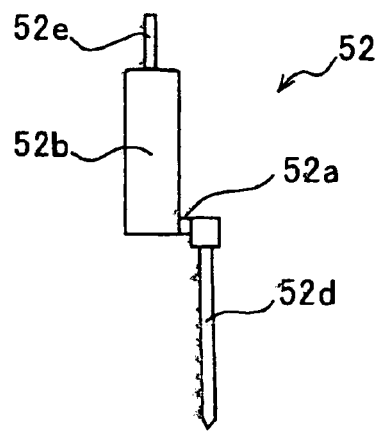
FIG. 4C is a side view of the connector terminal shown FIG. 3.

As shown in FIGS. 4A to 4C, the first connector terminal 52 includes a bottom portion 52a, two lateral portions 52b, 52c and a contacting portion 52d. The lateral portions 52b, 52c extend from opposed ends of the bottom portion 52a in a direction perpendicular to a plane of the bottom portion 52a. The contacting portion 52d extends generally from the center of the bottom portion 52a in the direction perpendicular to the plane of the bottom portion 52a on the opposite side, which is opposite to the lateral portions 52b, 52c. Projections 52e, 52f are provided to ends of the lateral portions 52b, 52c. Furthermore, a space between the projections 52e, 52f is generally equal to a length of one side of the acceleration sensor 50. Similar to the first connector terminal 52, each of the second connector terminal 53 and the reference connector terminals 54, 55 has a base portion 53a–55a, lateral portions 53b–55b, 53c–55c and a contacting portion 53d–55d. Furthermore, projections 53e–55e, 53f–55f are provided to ends of the lateral portions 53b–55b, 53c–55c of each of the second connector terminal 53 and the reference connector terminals 54, 55. The second connector terminal 53 and the reference connector terminals 54, 55 have the same shape as that of the first connector terminal 52 except the shape of the contacting portion and therefore will not be described further.

As shown in FIG. 3, the first connector terminal 52, the second connector terminal 53 and the reference connector terminals 54, 55 are molded integrally with the connector case 51 in such a manner that each of the projections 52e–55e, 52f–55f of the first connector terminal 52, the second connector terminal 53 and the reference connector terminals 54, 55 is opposed to the corresponding one of the first contact 50a, the second contact 50b and the reference contacts 50c, 50d while the corresponding side (side edge) of the acceleration sensor 50 is interposed therebetween. Furthermore, the acceleration sensor 50 side end(s) of each of the first connector terminal 52, the second connector terminal 53 and the reference connector terminals 54, 55 (the acceleration sensor 50 side ends of the lateral portions 52b–55b, 52c–55c of each of the first connector terminal 52, the second connector terminal 53 and the reference connector terminals 54, 55, which are exposed in an interior space of the acceleration sensor receiving portion 51a of the connector case 51, or the acceleration sensor 50 side end of the bottom portion of each of the first connector terminal 52, the second connector terminal 53 and the reference connector terminals 54, 55,) are generally parallel to the opposed side of the acceleration sensor 50 and are opposed to the corresponding two, respectively, of the first contact 50a, the second contact 50b and the reference contacts 50c, 50d.

Figure 5A:
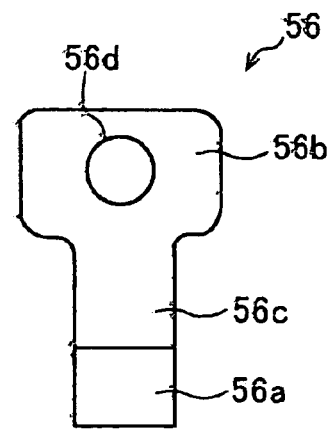
FIG. 5A is a top view of a lead shown FIG. 3.
Figure 5B:
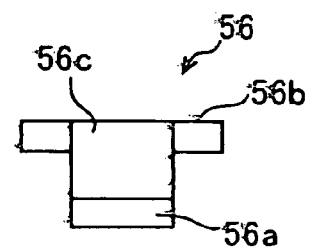
FIG. 5B is a front view of the lead shown FIG. 3.
Figure 5C:
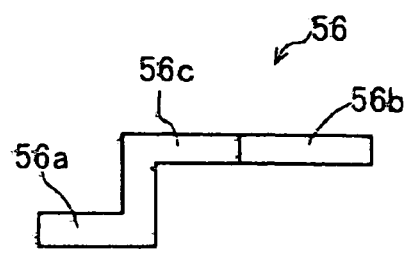
FIG. 5C is a side view of the lead shown FIG. 3.

The leads 56–59 are plate shaped conductors, which connect the first contact 50a, the second contact 50b and the reference contacts 50c, 50d of the acceleration sensor 50 to the first connector terminal 52, the second connector terminal 53 and the reference connector terminals 54, 55, respectively. As shown in FIGS. 5A–5C, the lead 56 includes an acceleration sensor connection 56a, a connector terminal connection 56b and an interconnecting portion 56c. The interconnecting portion 56c connects between the acceleration sensor connection 56a and the connector terminal connection 56b. A through hole 56d penetrates through the connector terminal connection 56b. Similar to the lead 56, each of the other leads 57–59 includes an acceleration sensor connection 57a–59a, a connector terminal connection 57b–59b and an interconnecting portion 57c–59c. A through hole 57d–59d penetrates through the connector terminal connection 57b–59b. The shapes of the leads 57–59 are the same as that of the lead 56 and therefore will not be described further.

As shown in FIG. 3, the acceleration sensor connection 56a of the lead 56 is soldered to the first contact 50a of the acceleration sensor 50. The connector terminal connection 56b of the lead 56 is soldered to the first connector terminal 52 in a state where the through hole 56d of the connector terminal connection 56b receives the projection 52e of the first connector terminal 52. The acceleration sensor connection 57a of the lead 57 is soldered to the second contact 50b of the acceleration sensor 50. The connector terminal connection 57b of the lead 57 is soldered to the second connector terminal 53 in a state where the through hole 57d of the connector terminal connection 57b receives the projection 53e of the second connector terminal 53. The acceleration sensor connections 58a, 59a of the leads 58, 59 are soldered to the reference contacts 50c, 50d, respectively, of the acceleration sensor 50. The connector terminal connections 58b, 59b of the leads 58, 59 are soldered to the reference connector terminals 54, 55, respectively, in a state where the through hole 58d, 59d of each connector terminal connection 58b, 59b receives the projection 54e, 55e of the corresponding reference connector terminal 54, 55.

Figure 6:
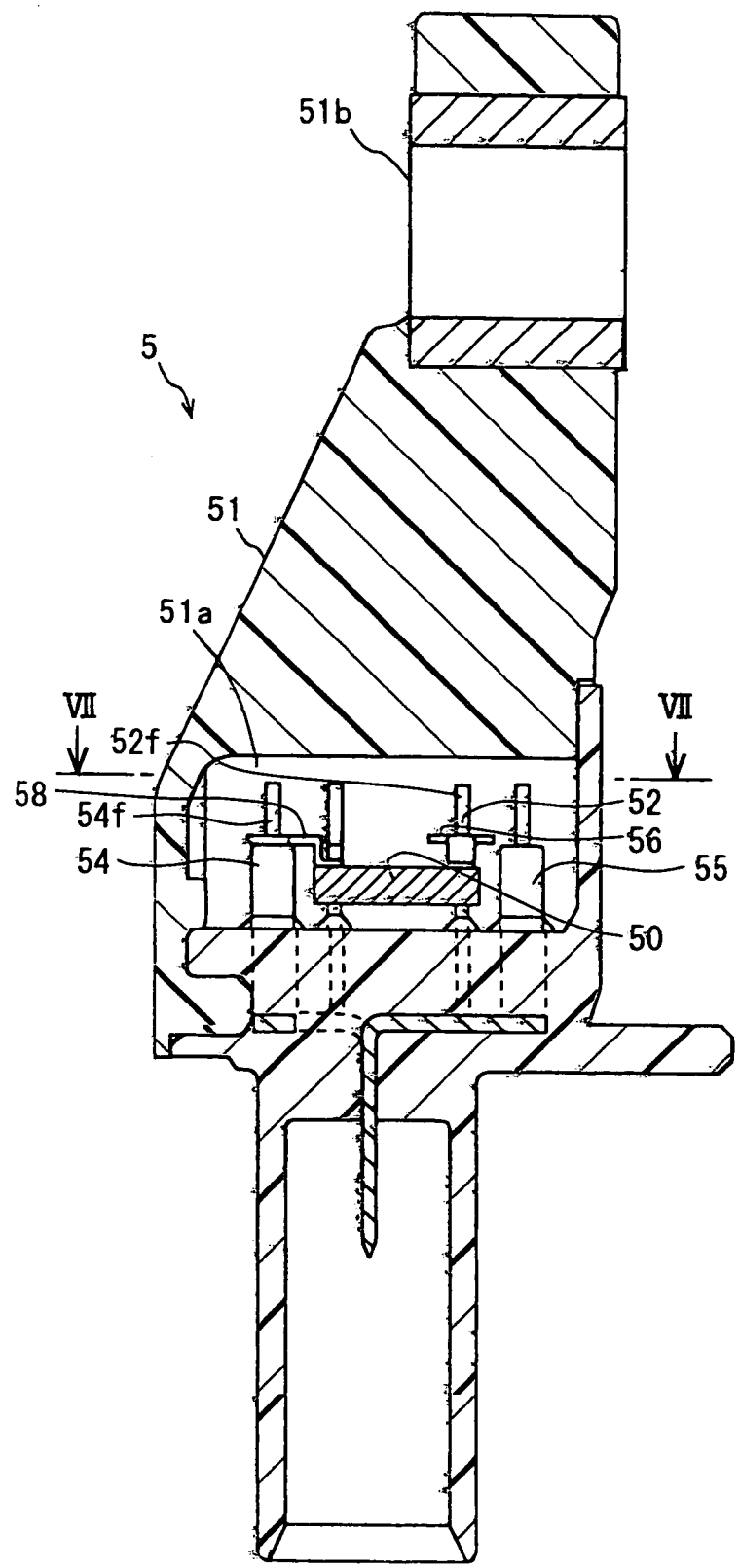
FIG. 6 is a cross sectional view of the collision sensing apparatus where a sensing direction of acceleration is changed from that of the collision sensing apparatus shown in FIGS. 2 and 3.

Next, with reference to FIGS. 6 and 7, there will be described another case where the sensing direction A of the acceleration with respect to the connector case 51 is changed by 90 degrees from the one shown in FIGS. 2 and 3. In this case, the orientation of the acceleration sensor 50 shown in FIG. 3 is rotated by 90 degrees in the clockwise direction. Due to the rotation of the acceleration sensor 50, for example, the lead 56, which is connected to the projection 52e of the first connector terminal 52 shown in FIG. 2, is now connected to the projection 52f of the first connector terminal 52, as shown in FIG. 6.

Figure 7:
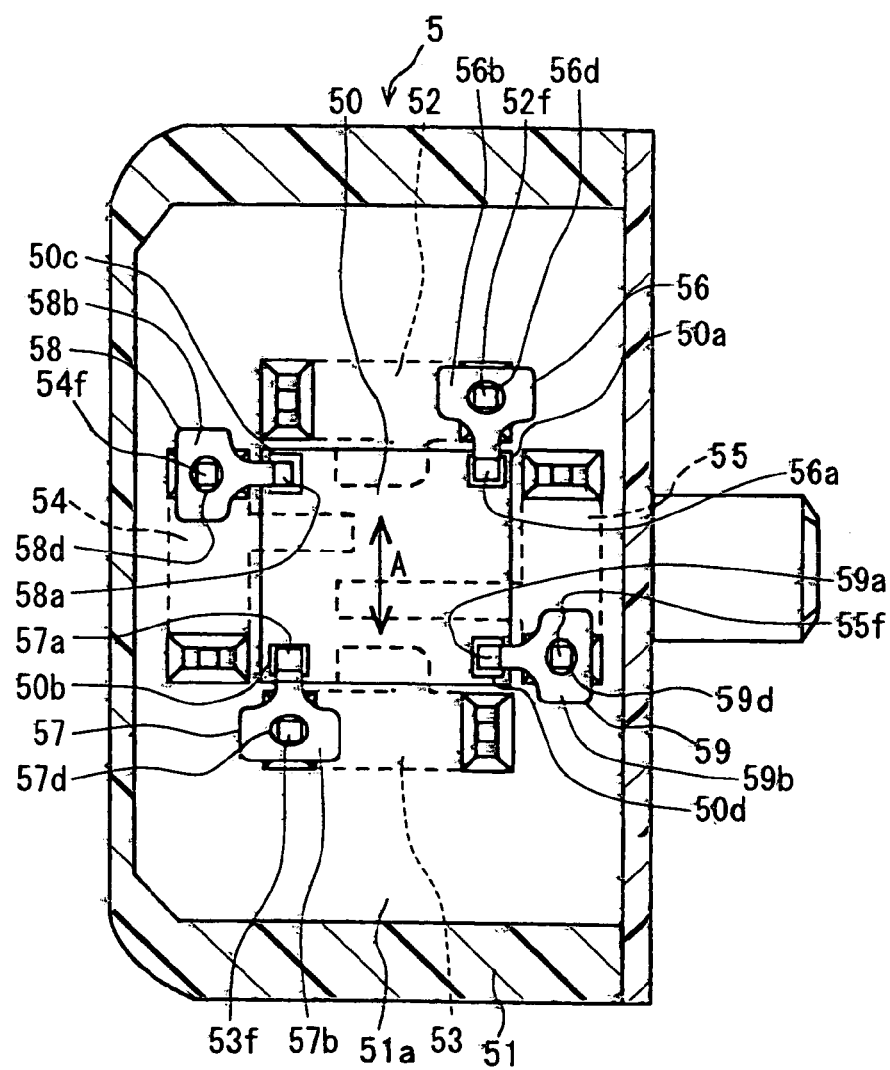
FIG. 7 is a cross sectional view taken along line VII—VII in FIG. 6.

As shown in FIG. 7, the acceleration sensor connection 56a of the lead 56 is soldered to the first contact 50a of the acceleration sensor 50. The connector terminal connection 56b of the lead 56 is soldered to the first connector terminal 52 in a state where the through hole 56d of the connector terminal connection 56b receives the projection 52f of the first connector terminal 52. The acceleration sensor connection 57a of the lead 57 is soldered to the second contact 50b of the acceleration sensor 50. The connector terminal connection 57b of the lead 57 is soldered to the second connector terminal 53 in a state where the through hole 57d of the connector terminal connection 57b receives the projection 53f of the second connector terminal 53. The acceleration sensor connections 58a, 59a of the leads 58, 59 are soldered to the reference contacts 50c, 50d, respectively, of the acceleration sensor 50. The connector terminal connections 58b, 59b of the leads 58, 59 are soldered to the reference connector terminals 54, 55, respectively, in a state where the through hole 58d, 59d of each connector terminal connection 58b, 59b receives the projection 54f, 55f of the corresponding reference connector terminal 54, 55. That is, the acceleration sensor 50 is rotated, and the connecting positions of the leads 56–59 with respect to the first connector terminal 52, the second connector terminal 53 and the reference connector terminals 54, 55 are changed. With this simple modification, the sensing direction A of the acceleration can be changed by 90 degrees.

Next, an operation of the air bag system 1 will be described in detail with reference to FIG. 1. With reference to FIG. 1, when the ignition switch 12 is turned on, the output voltage of the battery 13 is supplied, so that the air bag ECU 2 starts its operation. The air bag ECU 2 supplies the power source voltage to the collision sensing apparatuses 5–8 through the communication buses 3, 4. When the power source voltage is supplied, the collision sensing apparatuses 5–8 start its operation. Thereafter, the air bag ECU 2 sequentially and serially transfers the data transmission request command to the collision sensing apparatuses 5–8 through the communication buses 3, 4. Each collision sensing apparatus 5–8 receives the data transmission request command and determines whether the collision sensing apparatus 5–8 itself is the subject of the communication (the communication subject), to which the data transmission request command is addressed. When it is determined that the collision sensing apparatus 5–8 itself is the communication subject, the collision sensing apparatus 5–8 transmits the sensed acceleration data to the air bag ECU 2. The transmission of the sensed acceleration data from the collision sensing apparatuses 5–8 to the air bag ECU 2 is performed sequentially and serially. The air bag ECU 2 deploys the front driver seat side air bag 9, the front passenger seat side air bag 10 and/or the side air bag(s) 11 based on the measured acceleration, which is sensed by the internal sensor, and also the measured acceleration(s), which is sensed by the collision sensing apparatuses 5–8, thereby protecting the vehicle occupant(s).

Next, advantages of the first embodiment will be described. According to the first embodiment, the sensing direction A of the acceleration can be simply changed by rotating the acceleration sensor 50 and by changing the installation orientations of the leads 56–59 without a need for modifying the acceleration sensor 50, the connector case 51, the first connector terminal 52, the second connector terminal 53, the reference connector terminals 54,55 and the leads 56–59. Thus, the versatile collision sensing apparatuses can be constructed at the relatively low costs regardless of the sensing direction A of the acceleration.

Furthermore, according to the first embodiment, each of the projections of the first connector terminal 52, the second connector terminal 53 and the reference connector terminals 54, 55 is opposed to the corresponding one of the first contact 50a, the second contact 50b and the reference contacts 50c, 50d while the corresponding side (the side edge) of the acceleration sensor 50 is interposed therebetween. In this way, the lengths of the leads 56–59 can be reduced. Therefore, the collision sensing apparatuses can be constructed at the relatively low costs.

Furthermore, according to the first embodiment, the sensed acceleration data is transmitted from the first contact 50a based on the data transmission request command inputted from the first contact 50a, so that the acceleration data can be reliably outputted. The data transmission request command, which is inputted to the first contact 50a, is transmitted from the second contact 50b, and the data, which is inputted to the second contact 50b, is transmitted from the first contact 50a. In this way, the signals can be reliably communicated between each upstream side collision sensing apparatus and the corresponding downstream side collision sensing apparatus (see FIG. 1). In the acceleration sensor 50, the sensing device, which senses the acceleration, and the communicating device (the outputting device) are packaged into the single package, so that the collision sensing apparatus can be made compact.

SECOND EMBODIMENT

Figure 8:
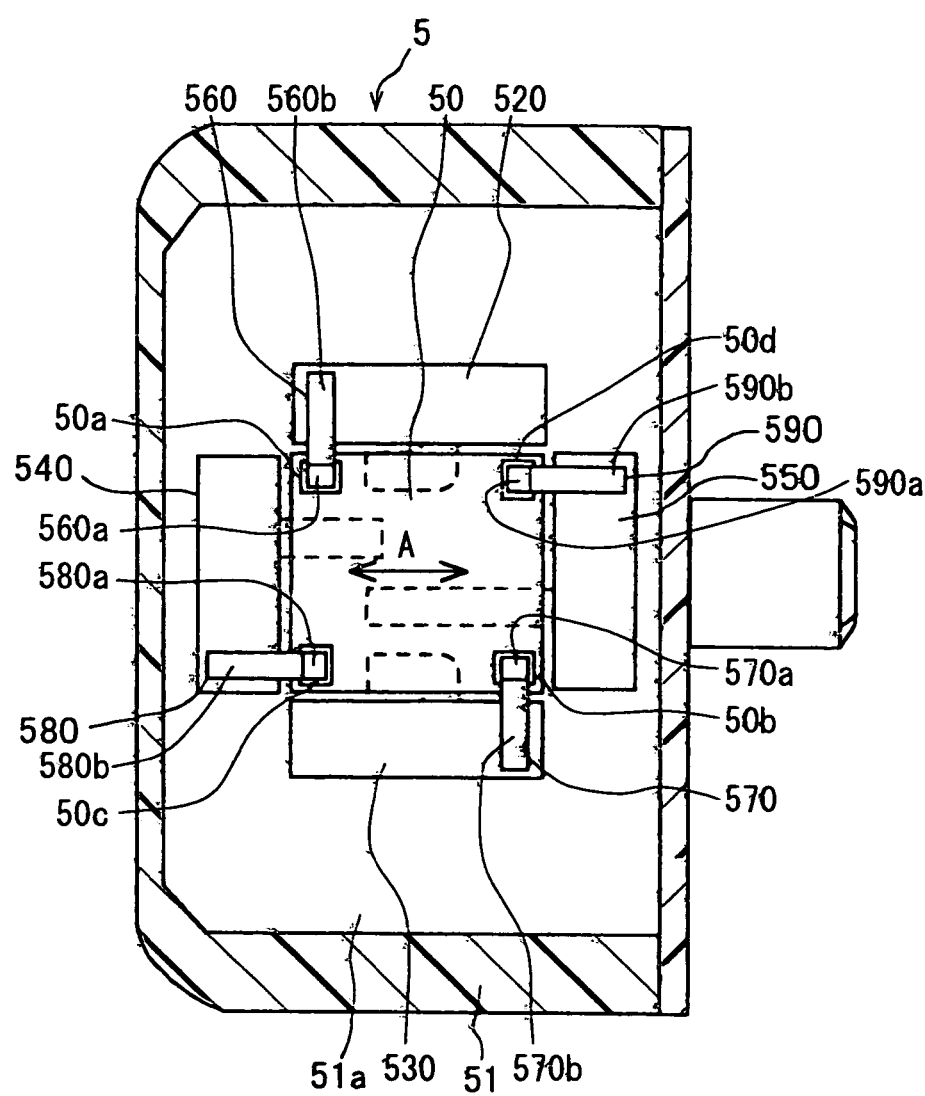
FIG. 8 is a cross sectional view of a collision sensing apparatus according to a second embodiment of the present invention.
Figure 9:
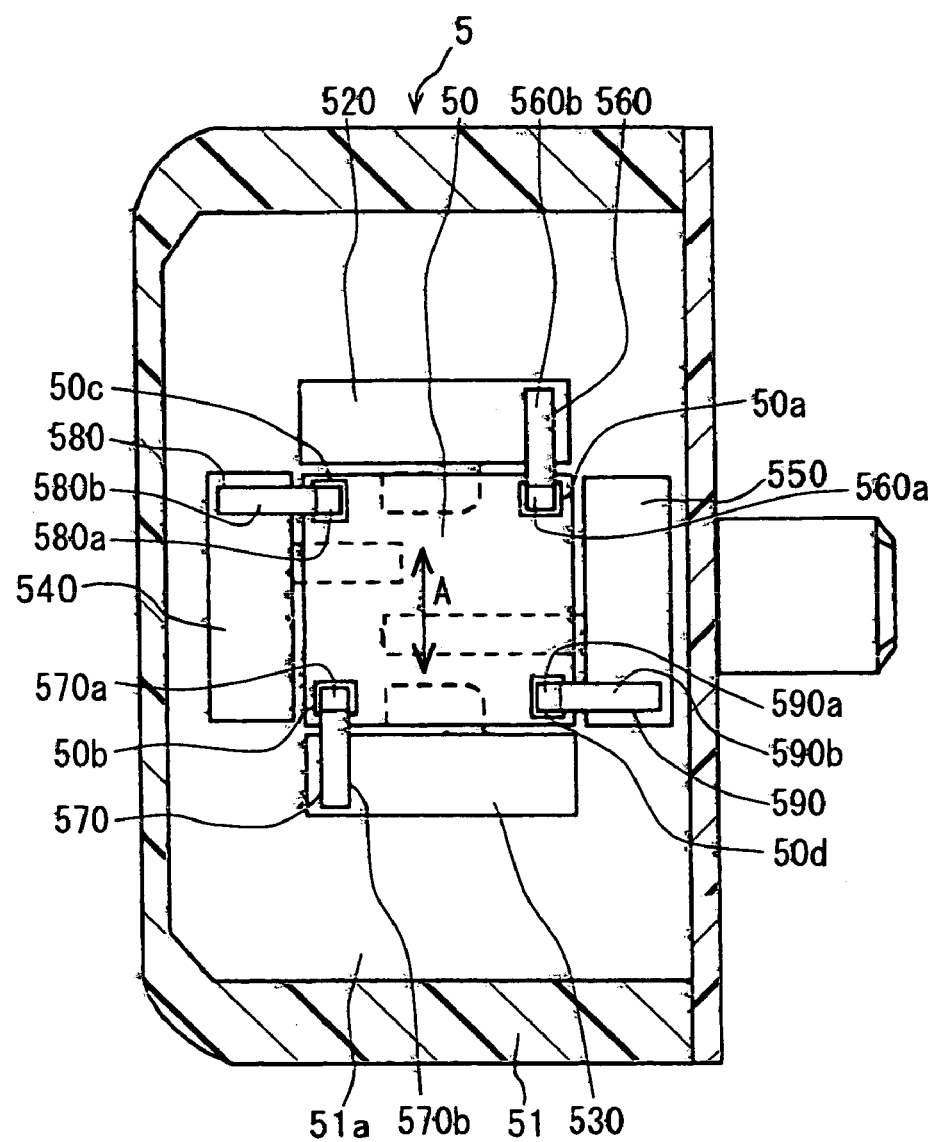
FIG. 9 is a cross sectional view of the collision sensing apparatus where a sensing direction of acceleration is changed from that of the collision sensing apparatus shown in FIG. 8.

Next, the collision sensing apparatus according to a second embodiment will be described. FIG. 8 shows a cross sectional view of the collision sensing apparatus, and FIG. 9 shows the cross sectional view of the collision sensing apparatus, in which the sensing direction A of the acceleration is changed from that of the collision sensing apparatus shown in FIG. 8. The collision sensing apparatus of the second embodiment is a modification of the collision sensing apparatus of the first embodiment, in which the shapes of the connector terminals and of the leads are partially modified from those of the first embodiment. The operation of the collision sensing apparatus of the second embodiment is substantially the same as that of the collision sensing apparatus of the first embodiment. In the following description, only the connector terminals and the leads, which are different from those of the first embodiment, will be described, and the other common components other than the connector terminals and the leads will not be described further. Furthermore, the components, which are the same as those of the first embodiment, will be indicated by the same numerals.

First, the structure will be described with reference to FIGS. 8 and 9. As shown in FIG. 8, the first connector terminal 520 is formed by modifying the first connector terminal 52 of the first embodiment in such a manner that the lateral portion 52b of the first connector terminal 52 is elongated in the longitudinal direction thereof and is bent toward the other lateral portion 52c side. The second connector terminal 530 and the reference connector terminals 540, 550 are formed by modifying the second connector terminal 53 and the reference connector terminals 54, 55 of the first embodiment in a manner similar to that of the first connector terminal 520 described above. The first connector terminal 520, the second connector terminal 530 and the reference connector terminals 540, 550 are molded integrally with the connector case 51 in the following manner. That is, the acceleration sensor 50 side end of each of the first connector terminal 520, the second connector terminal 530 and the reference connector terminals 540, 550 (more specifically, the acceleration sensor 50 side end of the exposed portion, i.e., the acceleration sensor 50 side end of the elongated portion of the one lateral portion, which is bent toward the other lateral portion, of each of the first connector terminal 520, the second connector terminal 530 and the reference connector terminals 540, 550 exposed in an interior space of the acceleration sensor receiving portion 51a of the connector case 51) is generally parallel to the opposed side of the acceleration sensor 50 and are opposed to the corresponding two, respectively, of the first contact 50a, the second contact 50b and the reference contacts 50c, 50d.

The lead 560 is formed by modifying the lead 56 of the first embodiment in such a manner that the width (measured in the left-right direction in FIG. 8) of the connector terminal connection 56b is reduced, and the through hole 56d is eliminated from the connector terminal connection 56b. The leads 570, 580, 590 are formed by modifying the leads 57–59 of the first embodiment in a manner similar to that of the lead 560 described above. The acceleration sensor connection 560a of the lead 560 is soldered to the first contact 50a of the acceleration sensor 50. The connector terminal connection 560b of the lead 560 is soldered to a left end portion of the first connector terminal 520, which is opposed to the first contact 50a in FIG. 8. The acceleration sensor connection 570a of the lead 570 is soldered to the second contact 50b of the acceleration sensor 50. The connector terminal connection 570b of the lead 570 is soldered to a right end portion of the second connector terminal 530, which is opposed to the second contact 50b in FIG. 8. The acceleration sensor connections 580a, 590a of the leads 580, 590 are soldered to the reference contacts 50c, 50d, respectively, of the acceleration sensor 50. The connector terminal connection 580b of the lead 580 is soldered to a lower end portion of the reference connector terminal 540, which is opposed to the reference contact 50c in FIG. 8. Furthermore, the connector terminal connection 590b of the lead 590 is soldered to an upper end portion of the reference connector terminal 550, which is opposed to the reference contact 50d in FIG. 8.

Next, with reference to FIG. 9, there will be described the case where the sensing direction A of the acceleration with respect to the connector case 51 is changed by 90 degrees from the one shown in FIG. 8. In this case, the orientation of the acceleration sensor 50 shown in FIG. 8 is rotated by 90 degrees in the clockwise direction.

As shown in FIG. 9, the acceleration sensor connection 560a of the lead 560 is soldered to the first contact 50a of the acceleration sensor 50. The connector terminal connection 560b of the lead 560 is soldered to a right end portion of the first connector terminal 520, which is opposed to the first contact 50a in FIG. 9. The acceleration sensor connection 570a of the lead 570 is soldered to the second contact 50b of the acceleration sensor 50. The connector terminal connection 570b of the lead 570 is soldered to a left end portion of the second connector terminal 530, which is opposed to the second contact 50b in FIG. 9. The acceleration sensor connections 580a, 590a of the leads 580, 590 are soldered to the reference contacts 50c, 50d, respectively, of the acceleration sensor 50. The connector terminal connection 580b of the lead 580 is soldered to an upper end portion of the reference connector terminal 540, which is opposed to the reference contact 50c in FIG. 9. Furthermore, the connector terminal connection 590b of the lead 590 is soldered to a lower end portion of the reference connector terminal 550, which is opposed to the reference contact 50d in FIG. 9. Similar to the first embodiment, the acceleration sensor 50 is rotated, and the connecting positions of the leads 560–590 with respect to the first connector terminal 520, the second connector terminal 530 and the reference connector terminals 540, 550 are changed. With this simple modification, the sensing direction A of the acceleration can be changed by 90 degrees.

Next, advantages of the second embodiment will be described. According to the second embodiment, unlike the first embodiment, there is no need to place the projection of each connector terminal through the through hole of the corresponding lead, so that the assembling work can be more easily performed. Furthermore, according to the second embodiment, the connection surface area between each lead and the corresponding connector terminal is increased, so that the sufficient strength can be achieved, and the electrical reliability can be improved.

THIRD EMBODIMENT

Figure 10:
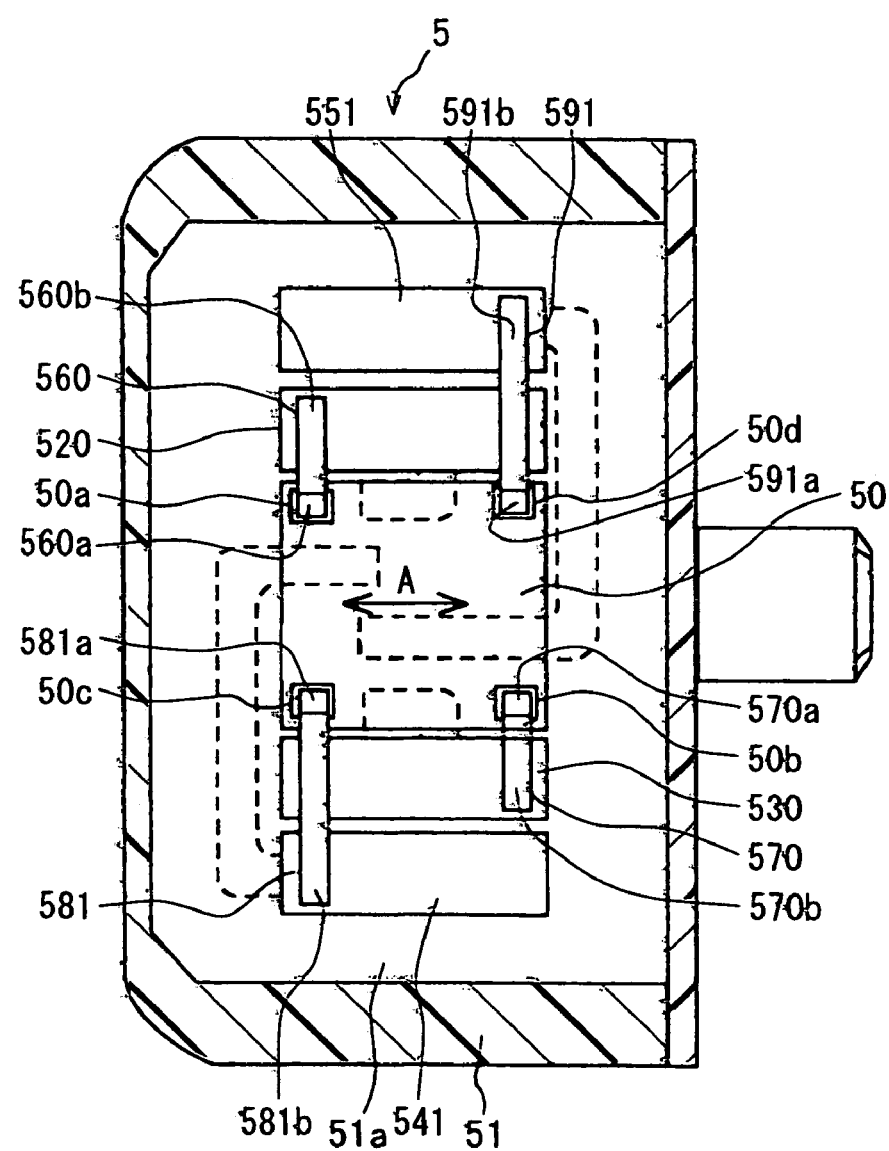
FIG. 10 is a cross sectional view of a collision sensing apparatus according to a third embodiment of the present invention.
Figure 11:
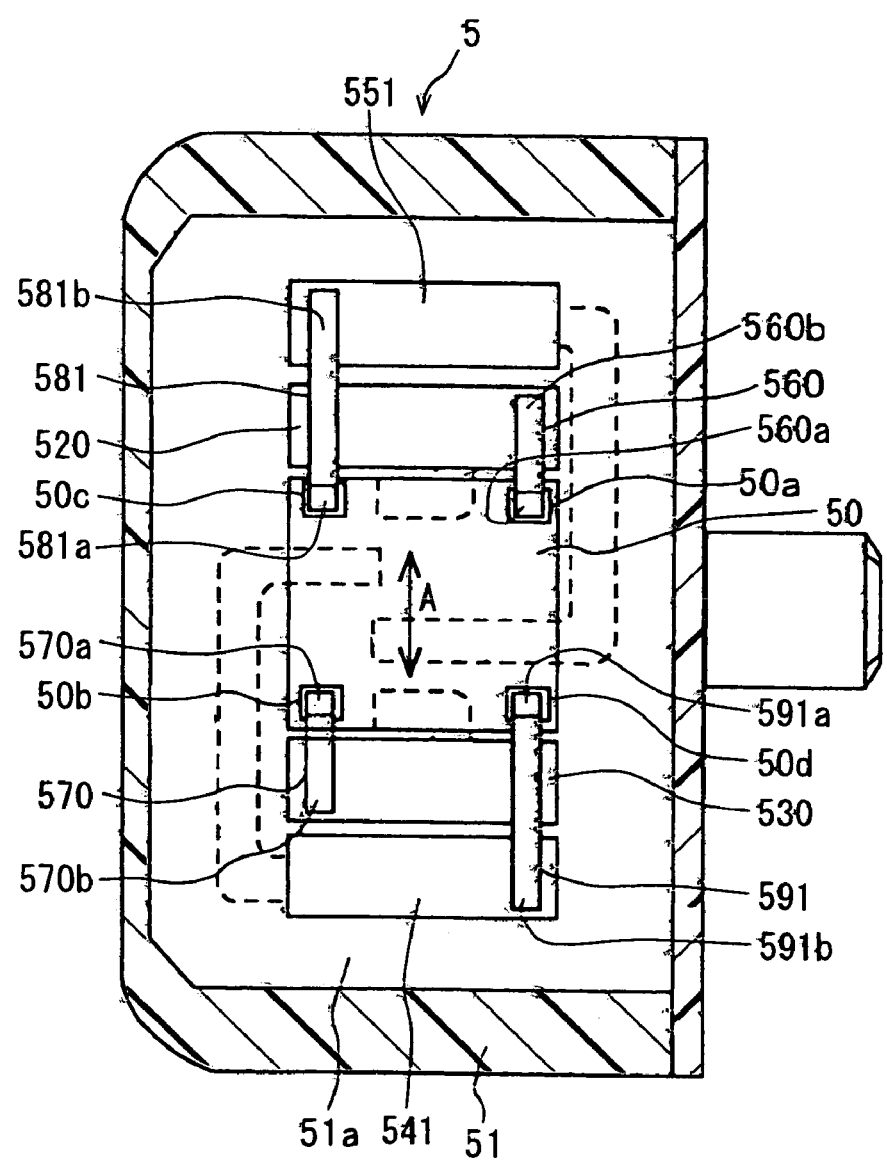
FIG. 11 is a cross sectional view of the collision sensing apparatus where a sensing direction of acceleration is changed from that of the collision sensing apparatus shown in FIG. 10.

Next, the collision sensing apparatus according to a third embodiment will be described. FIG. 10 shows a cross sectional view of the collision sensing apparatus, and FIG. 11 shows the cross sectional view of the collision sensing apparatus, in which the sensing direction A of the acceleration is changed from that of the collision sensing apparatus shown in FIG. 10. The collision sensing apparatus of the third embodiment is implemented by modifying the positions of the reference connector terminals and the shapes of the leads, which are connected to the reference connector terminals, of the collision sensing apparatus of the second embodiment. The operation of the collision sensing apparatus of the third embodiment is substantially the same as that of the collision sensing apparatus of the first and second embodiments. In the following description, only the reference connector terminals and the corresponding leads, which are different from those of the second embodiment, will be described, and the other common components other than the reference connector terminals and the corresponding leads will not be described further. Furthermore, the components, which are the same as those of the second embodiment, will be indicated by the same numerals.

First, the structure will be described with reference to FIGS. 10 and 11. As shown in FIG. 10, the reference connector terminals 541, 551 of the third embodiment are implemented by changing the positions of the reference connector terminals 540, 550 of the second embodiment. Due to the changes in the positions of the reference connector terminals, the shape of the contacting portion of each reference connector terminal is changed although the shape of the acceleration sensor side end of the reference connector terminal remains the same. The reference connector terminal 541 is molded integrally with the connector case 51 in such a manner that the acceleration sensor 50 side end of the reference connector terminal 541 exposed in the acceleration sensor receiving portion 51a is placed below the second connector terminal 530 and is generally parallel to the second connector terminal 530 in FIG. 10. The reference connector terminal 551 is molded integrally with the connector case 51 in such a manner that the acceleration sensor 50 side end of the reference connector terminal 551 exposed in the acceleration sensor receiving portion 51a is placed above the first connector terminal 520 and is generally parallel to the first connector terminal 520 in FIG. 10.

The leads 581, 591 are implemented by modifying the leads 580, 590 of the second embodiment in such a manner that the interconnecting portion of each of the leads 580, 590 is elongated in the longitudinal direction thereof due to the positioning of the reference connector terminals 541, 551 further away from the acceleration sensor 50. The acceleration sensor connection 560a of the lead 560 is soldered to the first contact 50a of the acceleration sensor 50. The connector terminal connection 560b of the lead 560 is soldered to a left end portion of the first connector terminal 520, which is opposed to the first contact 50a in FIG. 10. The acceleration sensor connection 570a of the lead 570 is soldered to the second contact 50b of the acceleration sensor 50. The connector terminal connection 570b of the lead 570 is soldered to a right end portion of the second connector terminal 530, which is opposed to the second contact 50b in FIG. 10. The acceleration sensor connections 581a, 591a of the leads 581, 591 are soldered to the reference contacts 50c, 50d, respectively, of the acceleration sensor 50. The connector terminal connection 581b of the lead 581 is soldered to a left end portion of the reference connector terminal 541, which is opposed to the reference contact 50c in FIG. 10. Furthermore, the connector terminal connection 591b of the lead 591 is soldered to a right end portion of the reference connector terminal 551, which is opposed to the reference contact 50d in FIG. 10. The leads 581, 591 are configured such that the leads 581, 591 do not contact the first connector terminal 520 and the second connector terminal 530.

Next, with reference to FIG. 11, there will be described the case where the sensing direction A of the acceleration with respect to the connector case 51 is changed by 90 degrees from the one shown in FIG. 10. In this case, the orientation of the acceleration sensor 50 shown in FIG. 10 is rotated by 90 degrees in the clockwise direction. The acceleration sensor connection 560a of the lead 560 is soldered to the first contact 50a of the acceleration sensor 50. The connector terminal connection 560b of the lead 560 is soldered to a right end portion of the first connector terminal 520, which is opposed to the first contact 50a in FIG. 11. The acceleration sensor connection 570a of the lead 570 is soldered to the second contact 50b of the acceleration sensor 50. The connector terminal connection 570b of the lead 570 is soldered to a left end portion of the second connector terminal 530, which is opposed to the second contact 50b in FIG. 11. The acceleration sensor connections 581a, 591a of the leads 581, 591 are soldered to the reference contacts 50c, 50d, respectively, of the acceleration sensor 50. The connector terminal connection 581b of the lead 581 is soldered to a left end portion of the reference connector terminal 551, which is opposed to the reference contact 50c in FIG. 11. Furthermore, the connector terminal connection 591b of the lead 591 is soldered to a right end portion of the reference connector terminal 541, which is opposed to the reference contact 50d in FIG. 11. Similar to the second embodiment, the acceleration sensor 50 is rotated, and the connecting positions of the leads 560, 570, 581, 591 with respect to the first connector terminal 520, the second connector terminal 530 and the reference connector terminals 541, 551 are changed. With this simple modification, the sensing direction A of the acceleration can be changed by 90 degrees.

Next, advantages of the third embodiment will be described. According to the third embodiment, unlike the first embodiment, there is no need to place the projection of each connector terminal through the through hole of the corresponding lead, so that the assembling work can be more easily performed. Furthermore, in FIGS. 10 and 11, the first connector terminal 520, the second connector terminal 530 and the reference connector terminals 541, 551 are arranged only at the upper side or the lower side of the acceleration sensor 50, so that the size of the collision sensing apparatus in the left-to-right direction can be limited to make the collision sensing apparatus compact.

FOURTH EMBODIMENT

Figure 12:
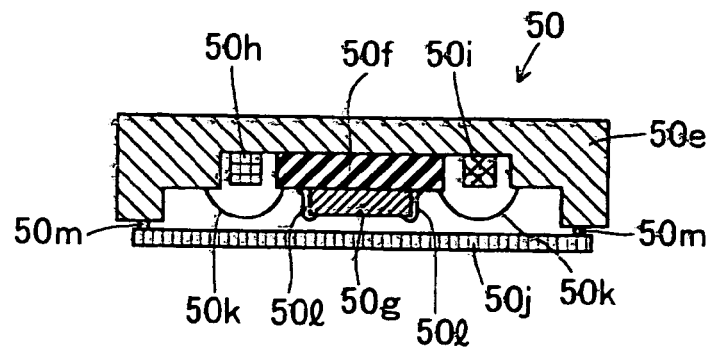
FIG. 12 is a cross sectional view of a collision sensor of a collision sensing apparatus according to a fourth embodiment of the present invention.
Figure 13:
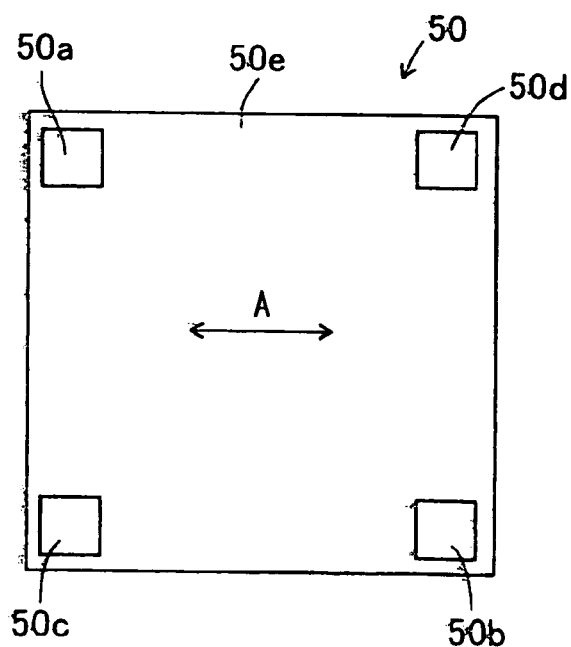
FIG. 13 is a top view of the acceleration sensor shown in FIG. 12.
Figure 14:
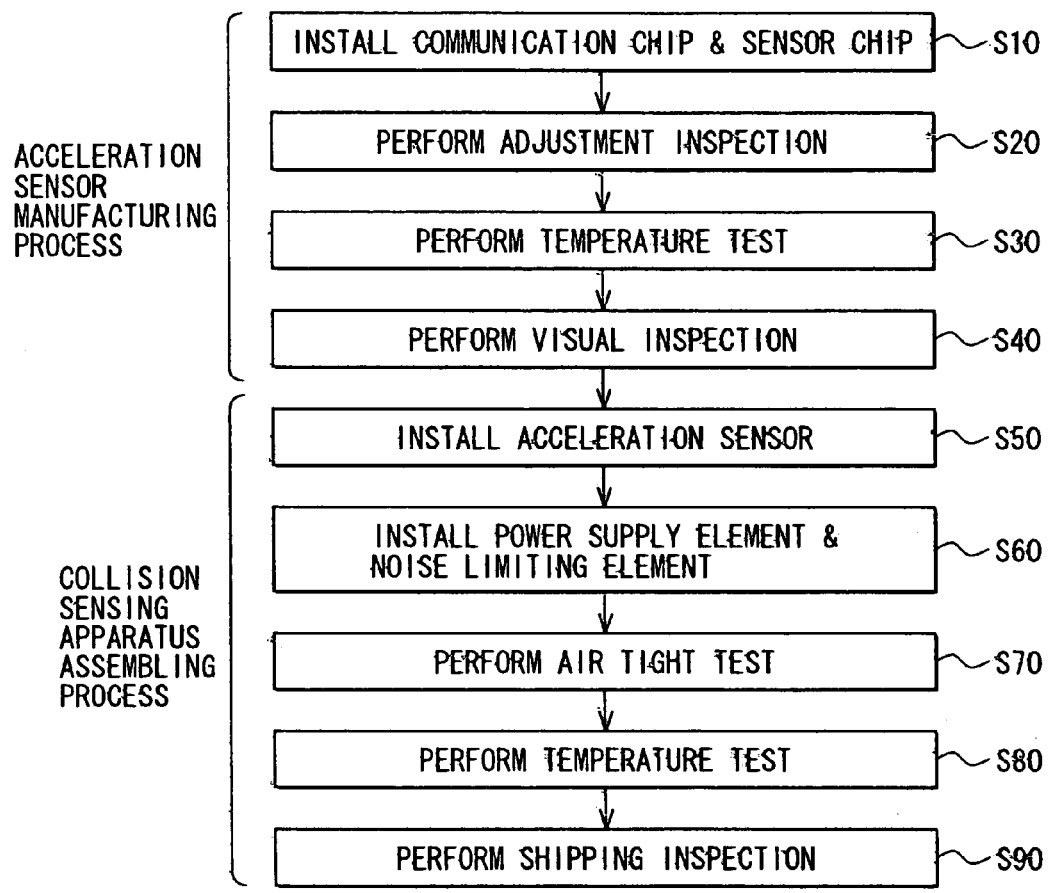
FIG. 14 is a flowchart showing manufacturing steps of a collision sensing apparatus, which has an acceleration sensor that includes a communication chip (an outputting device) and a sensor chip (a sensing device) packaged into a single package.
Figure 15:
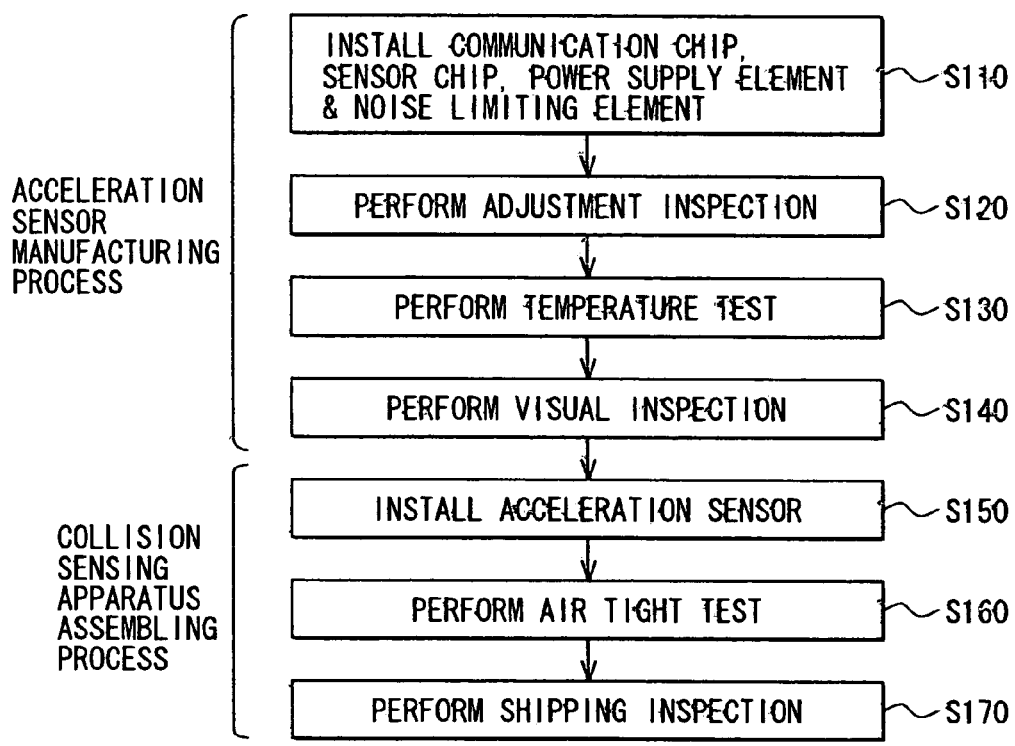
FIG. 15 is a flowchart showing manufacturing steps of the collision sensing apparatus according to the fourth embodiment.

Next, the acceleration sensing apparatus according to a fourth embodiment will be described. FIG. 12 is a cross sectional view of the acceleration sensor 50 of the fourth embodiment, and FIG. 13 is a top view of the acceleration sensor 50 shown in FIG. 12. FIG. 14 is a flowchart showing manufacturing steps S10–S90 of a collision sensing apparatus, which has an acceleration sensor that includes a communication chip (an outputting device) and a sensor chip (a sensing device) packaged into a single package. FIG. 15 is a flowchart showing manufacturing steps S110–S170 of the collision sensing apparatus according to the fourth embodiment. The collision sensing apparatus of the fourth embodiment is a modification of the collision sensing apparatus of the first embodiment, in which the acceleration sensor is modified. The rest of the structure and operation of the collision sensing apparatus of the fourth embodiment other than the acceleration sensor are the same as those of the collision sensing apparatus of the first embodiment. In the following description, only the acceleration sensor, which is different from that of the first embodiment, will be described, and the other common components other than the acceleration sensor will not be described further. Furthermore, the components, which are the same as those of the first embodiment, will be indicated by the same numerals.

As shown in FIGS. 12 and 13, the acceleration sensor 50 (the sensor) includes a ceramic substrate 50e, a communication chip (an outputting device) 50f, a sensor chip (a sensing device) 50g, a power supply element (a power supply device) 50h, a noise limiting element (a noise reducing device) 50i and a cover 50j.

The ceramic substrate 50e is a substrate, which has an n-shaped cross section and a square top surface and on which the communication chip 50f, the sensor chip 50g, the power supply element 50h and the noise limiting element 50i are arranged and are electrically connected. The first contact 50a and the second contact 50b are arranged at two diagonally opposed corner portions, respectively, of the square top surface of the ceramic substrate 50e. Furthermore, the reference contacts 50c, 50d are arranged at the other two diagonally opposed corner portions, respectively, of the square top surface of the ceramic substrate 50e.

The communication chip 50f is a chip that controls transmission and reception of the data. The communication chip 50f is fixed to the bottom surface of the ceramic substrate 50e in FIG. 12 and is connected to the first contact 50a, the second contact 50b and the reference contacts 50c, 50d by the wire bonding 50k via through holes and the pattern formed in the ceramic substrate 50e.

The sensor chip 50g is a chip that senses the acceleration in a predetermined direction. The sensor chip 50g is fixed to the bottom surface of the communication chip 50f in FIG. 12 and is connected to the communication chip 50f via wire bonding 50l.

The power supply element 50h is an element that stably supplies the electric power to the communication chip 50f and the sensor chip 50g and may be, for example, a capacitor that charges electric power. The noise limiting element 50i is an element that reduces electrical noises applied to the communication chip 50f and the sensor chip 50g. The power supply element 50h and the noise limiting element 50i are connected to the communication chip 50f and the sensor chip 50g through the pattern formed on the ceramic substrate 50e.

The cover 50j is a square metal plate, which covers an opening of the ceramic substrate 50e. The cover 50j is connected to the ceramic substrate 50e through a connecting member 50m. Therefore, the communication chip 50f, the sensor chip 50g, the power supply element 50h and the noise limiting element 50i are sealed by the ceramic substrate 50e and the cover 50j.

As described above, the communication chip 50f, the sensor chip 50g, the power supply element 50h and the noise limiting element 50i are packaged into the single package using the ceramic substrate 50e as its central component.

Next, advantages will be described. According to the fourth embodiment, the number of temperature tests can be reduced in the manufacturing process, so that the collision sensing apparatus can be constructed at the relatively low costs. The output of the collision sensing apparatus changes depending on the temperature. Thus, the temperature test is performed in the manufacturing process to determine whether a change in the output of the collision sensing apparatus is within an acceptable range. In the case of FIG. 14, the communication chip and the sensor chip are packaged into the single package to form the acceleration sensor (see steps S10–S40). In such a case, as shown in FIG. 14, the temperature test is performed at step S30 on the acceleration sensor, which is formed as the single package. Furthermore, the temperature test is performed at step S80 once again on the collision sensing apparatus after installation of the power supply element and the noise limiting element into the collision sensing apparatus (see steps S50–S90). This additional temperature test is performed to determine the influence of the temperature on the power supply element and the noise limiting element. That is, the temperature test needs to be performed twice. In contrast, when the communication chip 50f, the sensor chip 50g, the power supply element 50h and the noise limiting element 50i are packaged into the single package using the ceramic substrate 50e as its central component, the temperature test needs to be performed only once at step S130, as shown in FIG. 15. Accordingly, the number of temperature test steps can be reduced in the manufacturing process, so that the collision sensing apparatus can be constructed at the relatively low costs.

Figure 16:
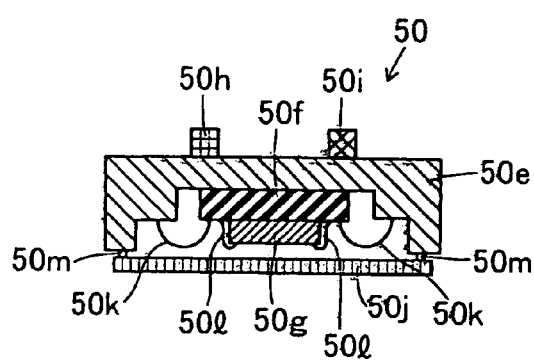
FIG. 16 is a cross sectional view of a modification of the acceleration sensor of the fourth embodiment.
Figure 17:
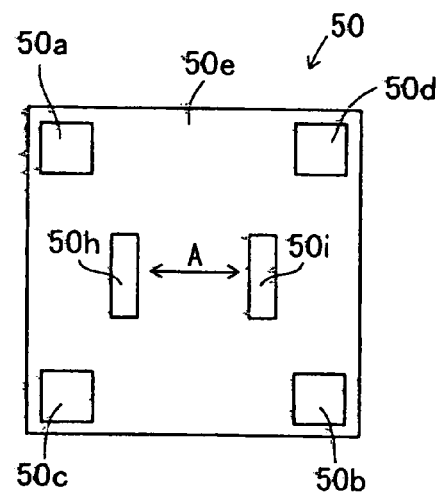
FIG. 17 is a top view of the acceleration sensor shown in FIG. 16.
Figure 18:
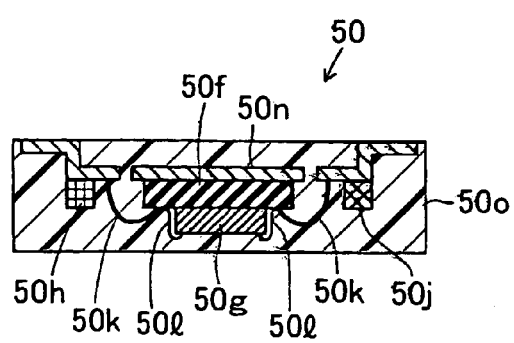
FIG. 18 is a cross sectional view of another modification of the acceleration sensor of the fourth embodiment.
Figure 19:
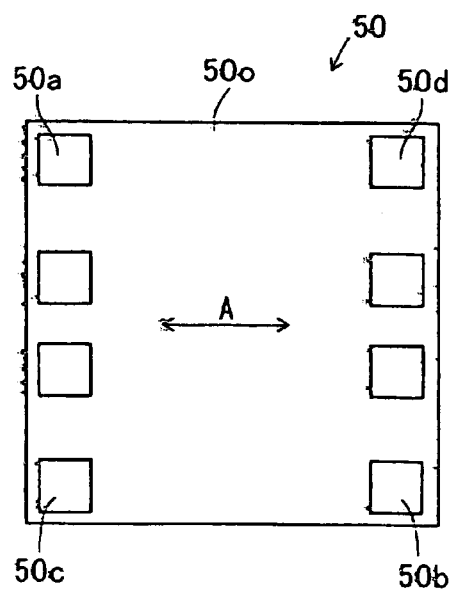
FIG. 19 is a top view of the acceleration sensor shown in FIG. 18.

In the fourth embodiment, the communication chip 50f, the sensor chip 50g, the power supply element 50h and the noise limiting element 50i are sealed by the ceramic substrate 50e and the cover 50j. However, the present invention is not limited to this construction. As shown in FIGS. 16 and 17, the power supply element 50h and the noise limiting element 50i need not be sealed between the ceramic substrate 50e and the cover 50j. More specifically, the power supply element 50h and the noise limiting element 50i may be fixed to the top surface of the ceramic substrate 50e, as shown in FIG. 16. Furthermore, as shown in FIGS. 18 and 19, a lead frame 50n, to which the communication chip 50f, the sensor chip 50g, the power supply element 50h and the noise limiting element 50i are secured, may be integrally molded with a resin material to form the case 50o. Here, the lead frame 50n is a metal plate, which fixes and electrically connects the communication chip 50f, the sensor chip 50g, the power supply element 50h and the noise limiting element 50i. The ends of the lead frame 50n are arranged in the top surface of the case 50o as the first contact 50a, the second contact 50b and the reference contacts 50c, 50d. The first contact 50a and the second contact 50b are arranged at two diagonally opposed corner portions of the top surface of the case 50o, and the reference contacts 50c, 50d are arranged at the other two diagonally opposed corner portions of the top surface of the case 50o. In this case too, the number of the temperature tests can be reduced in the manufacturing process, so that the collision sensing apparatus can be constructed at the relatively low costs.

In the first to third embodiments, the acceleration sensor has the square shape (the square form). However, the present invention is not limited to this. The acceleration sensor only needs to have a quadrangular shape (a quadrangular form). For example, the acceleration sensor may have a rectangular shape. In this instance, the shapes of the connector terminals and of the leads should be optimally set, and thereby the sensing direction of the acceleration can be changed with or without a small change in the components. Furthermore, in the first to third embodiments, the acceleration sensor includes the two reference contacts. However, the present invention is not limited to this. For instance, the acceleration sensor may include a single reference contact. Even in such a case, the advantages similar to those described above can be achieved. Furthermore, in the first to third embodiments, the leads are connected to the acceleration sensor and the connector terminals by the soldering. However, the present invention is not limited to this. For instance, the leads may be connected to the acceleration sensor and the connector terminals by welding. Further alternatively, the contacts of the acceleration sensor and the corresponding connector terminals may be connected together by wire bonding. That is, any type of connection can be made as long as it can electrically connect the acceleration sensor (more specifically, the contact of the acceleration sensor) to the corresponding connector terminals.

Furthermore, the acceleration sensor 50 of the fourth embodiment or its modification may be used as the acceleration sensor 50 of any of the first to third embodiments. In this way, the advantages similar to those of the fourth embodiment can be additionally achieved in any of the first to third embodiments.

Additional advantages and modifications will readily occur to those skilled in the art. The invention in its broader terms is therefore not limited to the specific details, representative apparatus, and illustrative examples shown and described.

What is claimed is:

1. A sensing apparatus comprising:
   a sensor that senses a physical acceleration in a predetermined direction and is shaped into a quadrangular form, wherein:
      the sensor includes a first input/output contact, a second input/output contact and at least one reference contact;
      the first input/output contact and the second input/output contact are arranged in two diagonally opposed corner portions, respectively, of the sensor; and
      the at least one reference contact is arranged in at least one of the other two diagonally opposed corner portions of the sensor;
   a first connector terminal that conducts an input/output signal to the first input/output contact and is arranged such that a sensor side end of the first connector terminal is opposed to one of two adjacent sides of the sensor, which come together at the corner portion of the sensor where the first input/output contact is arranged;
   a second connector terminal that conducts an input/output signal to the second input/output contact and is arranged such that a sensor side end of the second connector terminal is opposed to an opposite side of the sensor that is opposite from the side of the sensor, to which the sensor side end of the first connector terminal is opposed;
   at least one reference connector terminal that conducts a reference signal to the at least one reference contact and is arranged such that a sensor side end of each of the at least one reference connector terminal is opposed to a corresponding one of two mutually opposed sides of the sensor, to which the first connector terminal and the second connector terminal are not opposed; and
   a plurality of leads that connect the first input/output contact, the second input/output contact and the at least one reference contact to the first connector terminal, the second connector terminal and the at least one reference connector terminal, respectively.

2. The sensing apparatus according to claim 1, wherein:
   the sensor side end of the first connector terminal is opposed to the corner portion of the sensor, at which the first input/output contact is arranged;
   the sensor side end of the second connector terminal is opposed to the corner portion of the sensor, at which the second input/output contact is arranged; and
   the sensor side end of the at least one reference connector terminal is opposed to the at least one of the other two diagonally opposed corner portions of the sensor, at which the at least one reference contact is provided.

3. The sensing apparatus according to claim 1, wherein the sensor outputs the sensed physical acceleration from the first input/output contact based on a signal, which is inputted to the first input/output contact.

4. The sensing apparatus according to claim 1, wherein:
the sensor includes:
a sensing device that senses the physical acceleration in the predetermined direction; and
an outputting device that outputs the sensed physical acceleration;
the sensing device and the outputting device are packaged into a single package.

5. The sensing apparatus according to claim 1, wherein:
the sensor includes:
a sensing device that senses the physical acceleration in the predetermined direction;
an outputting device that outputs the sensed physical acceleration;
a power supply device that supplies a drive voltage for driving the sensing device and the outputting device; and
a noise reducing device that reduces noises applied to the sensing device and the outputting device; and
the sensing device, the outputting device, the power supply device and the noise reducing device are packaged into a single package.

6. The sensing apparatus according to claim 1, wherein:
the quadrangular form of the sensor is a square form having the sides of generally equal size;
the at least one reference contact includes two reference contacts, which are arranged in the other two diagonally opposed corner portions, respectively, of the sensor; and
the at least one reference connector terminal includes two reference connector terminals, which conduct the reference signal to the reference contacts, respectively, and are arranged such that the sensor side ends of the reference connector terminals are opposed to the two mutually opposed sides, respectively, of the sensor.

7. The sensing apparatus according to claim 6, wherein:
an extent of the first connector terminal, which is measured in a direction parallel to the side of the sensor that is adjacent to and is opposed to the first connector terminal, is generally equal to an extent of the side of the sensor that is adjacent to and is opposed to the first connector terminal;
an extent of the second connector terminal, which is measured in a direction parallel to the side of the sensor that is adjacent to and is opposed to the second connector terminal, is generally equal to an extent of the side of the sensor that is adjacent to and is opposed to the second connector terminal;
an extent of one of the reference connector terminals, which is measured in a direction parallel to the side of the sensor that is adjacent to and is opposed to the one of the reference connector terminals, is generally equal to an extent of the side of the sensor that is adjacent to and is opposed to the one of the reference connector terminals; and
an extent of the other one of the reference connector terminals, which is measured in a direction parallel to the side of the sensor that is adjacent to and is opposed to the other one of the reference connector terminals, is generally equal to an extent of the side of the sensor that is adjacent to and is opposed to the other one of the reference connector terminals.

8. A sensing apparatus comprising:
a sensor that senses a physical acceleration in a predetermined direction and is shaped into a quadrangular form, wherein:
the sensor includes a first input/output contact, a second input/output contact and at least one reference contact;
the first input/output contact and the second input/output contact are arranged in two diagonally opposed corner portions, respectively, of the sensor; and
the at least one reference contact is arranged in at least one of the other two diagonally opposed corner portions of the sensor;
a first connector terminal that conducts an input/output signal to the first input/output contact and is arranged such that a sensor side end of the first connector terminal is opposed to one of two adjacent sides of the sensor, which come together at the corner portion of the sensor where the first input/output contact is arranged;
a second connector terminal that conducts an input/output signal to the second input/output contact and is arranged such that a sensor side end of the second connector terminal is opposed to an opposite side of the sensor that is opposite from the side of the sensor, to which the sensor side end of the first connector terminal is opposed;
at least one reference connector terminal that conducts a reference signal to the at least one reference contact and is arranged such that a sensor side end of each of the at least one reference connector terminal is opposed to a corresponding one of:
the side of the sensor, to which the first connector terminal is opposed; and
the side of the sensor, to which the second connector terminal is opposed; and
a plurality of leads that connect the first input/output contact, the second input/output contact and the at least one reference contact to the first connector terminal, the second connector terminal and the at least one reference connector terminal, respectively.

9. The sensing apparatus according to claim 8, wherein:
the sensor side end of the first connector terminal is opposed to the corner portion of the sensor, at which the first input/output contact is arranged;
the sensor side end of the second connector terminal is opposed to the corner portion of the sensor, at which the second input/output contact is arranged; and
the sensor side end of the at least one reference connector terminal is opposed to the at least one of the other two diagonally opposed corner portions of the sensor, at which the at least one reference contact is provided.

10. The sensing apparatus according to claim 8, wherein the sensor outputs the sensed physical acceleration from the first input/output contact based on a signal, which is inputted to the first input/output contact.

11. The sensing apparatus according to claim 8, wherein:
the sensor includes:
a sensing device that senses the physical acceleration in the predetermined direction; and
an outputting device that outputs the sensed physical acceleration;
the sensing device and the outputting device are packaged into a single package.

12. The sensing apparatus according to claim 8, wherein:
the sensor includes:
- a sensing device that senses the physical acceleration in the predetermined direction;
- an outputting device that outputs the sensed physical acceleration;
- a power supply device that supplies a drive voltage for driving the sensing device and the outputting device; and
- a noise reducing device that reduces noises applied to the sensing device and the outputting device; and the sensing device, the outputting device, the power supply device and the noise reducing device are packaged into a single package.

13. The sensing apparatus according to claim 8, wherein:
the quadrangular form of the sensor is a square form having the sides of generally equal size;
the at least one reference contact includes two reference contacts, which are arranged in the other two diagonally opposed corner portions, respectively, of the sensor; and
the at least one reference connector terminal includes two reference connector terminals, which conduct the reference signal to the reference contacts, respectively, and are arranged such that the sensor side end of one of the reference connector terminals is opposed to the side of the sensor, to which the first connector terminal is opposed, and the sensor side end of the other one of the reference connector terminals is opposed to the side of the sensor, to which the second connector terminal is opposed.

14. The sensing apparatus according to claim 13, wherein:
an extent of the first connector terminal, which is measured in a direction parallel to the side of the sensor that is opposed to the first connector terminal, is generally equal to an extent of the side of the sensor that is opposed to the first connector terminal;
an extent of the second connector terminal, which is measured in a direction parallel to the side of the sensor that is opposed to the second connector terminal, is generally equal to an extent of the side of the sensor that is opposed to the second connector terminal;
an extent of the one of the reference connector terminals, which is measured in a direction parallel to the side of the sensor that is opposed to the first connector terminal, is generally equal to the extent of the side of the sensor that is opposed to the first connector terminal; and
an extent of the other one of the reference connector terminals, which is measured in a direction parallel to the side of the sensor that is opposed to the second connector terminal, is generally equal to the extent of the side of the sensor that is opposed to the second connector terminal.

* * * * *